US012084909B2

(12) United States Patent
Lee et al.

(10) Patent No.: US 12,084,909 B2
(45) Date of Patent: Sep. 10, 2024

(54) DOUBLE-SKIN STRUCTURE

(71) Applicants: Dong-A University Research Foundation For Industry-Academy Cooperation, Busan (KR); GM CORP., Seongnam-si (KR); Oh Keum Kwon, Seoul (KR); Mirae Environment Plan, Seoul (KR)

(72) Inventors: Keon Ho Lee, Busan (KR); Jurng Jae Yee, Busan (KR); Seong Hoon Kee, Busan (KR); Dong Keon Kim, Sejong-si (KR)

(73) Assignees: Dong-A University Research Foundation For Industry-Academy Cooperation, Busan (KR); GM CORP., Seongnam (KR); Oh Keum Kwon, Seoul (KR); Mirae Environmental Plan, Seoul (KR)

( * ) Notice: Subject to any disclaimer, the term of this patent is extended or adjusted under 35 U.S.C. 154(b) by 252 days.

(21) Appl. No.: 17/834,893

(22) Filed: Jun. 7, 2022

(65) Prior Publication Data

US 2022/0403698 A1 Dec. 22, 2022

(30) Foreign Application Priority Data

Jun. 15, 2021 (KR) ........................ 10-2021-0077211

(51) Int. Cl.
*E06B 3/67* (2006.01)

(52) U.S. Cl.
CPC .................................. *E06B 3/6722* (2013.01)

(58) Field of Classification Search
CPC ....................... E06B 3/6722; E06B 2009/2643
See application file for complete search history.

(56) References Cited

U.S. PATENT DOCUMENTS 2,530,218 A * 11/1950 Barrows ................. E06B 9/264 160/122
4,649,980 A * 3/1987 Kunz ........................ E06B 9/24 160/310

(Continued)

FOREIGN PATENT DOCUMENTS

KR 20020011024 A 2/2002
KR 101023748 B1 3/2011

(Continued)

OTHER PUBLICATIONS

English language Abstract of KR 101076408 B1 (Oct. 25, 2011).

(Continued)

*Primary Examiner* — Andrew J Triggs
(74) *Attorney, Agent, or Firm* — Hershkovitz & Associates, PLLC; Abe Hershkovitz

(57) ABSTRACT

A slim double-skin structure according to one aspect of the present invention may comprise: a window frame, an outer window sash frame provided on an outdoor side and coupled to the window frame, an outer glass provided on the outer window sash frame, an inner window sash frame provided on an indoor side and coupled to the window frame, an inner glass provided on the inner window sash frame, an awning film provided in a hollow layer formed between the outer glass and the inner glass to serve as a shading, and a case-type glass fixing frame which is provided in the outer window sash frame so as to be located in the hollow layer and fixes the outer glass to the outer window sash frame concurrently with building-in and guiding the awning film.

6 Claims, 5 Drawing Sheets

(56) References Cited

U.S. PATENT DOCUMENTS

| | | | | |
|---|---|---|---|---|
| 11,180,953 | B2 * | 11/2021 | Snader | E06B 3/6722 |
| 2022/0403698 | A1 * | 12/2022 | Lee | E06B 3/2605 |

FOREIGN PATENT DOCUMENTS

| | | | |
|---|---|---|---|
| KR | 101076408 | B1 | 10/2011 |
| KR | 200485829 | Y1 | 2/2018 |
| KR | 102135190 | B1 | 7/2020 |

OTHER PUBLICATIONS

English language Abstract of KR 102135190 B1 (Jul. 17, 2020).
English language Abstract of KR 101023748 B1 (Mar. 25, 2011).
English language Abstract of KR 200485829 Y1 (Feb. 28, 2018).
Office Action in related Korean Application No. 10-2021-0077211, dated Sep. 9, 2021.
English language Abstract of KR 20020011024 A (Feb. 7, 2002).

* cited by examiner

DOUBLE-SKIN STRUCTURE

CROSS-REFERENCE TO RELATED APPLICATION

This U.S. Patent Application claims priority of Republic of Korea Patent Application No. 10-2021-0077211 filed Jun. 15, 2021, the disclosure of which is incorporated herein in its entirety by specific reference thereto.

TECHNICAL FIELD

The present invention relates to a slim double-skin structure (or a slim double-outer skin structure), more specifically, a slim double-skin structure enabling to reduce a width of an air cavity layer (or a hollow layer) of a corridor-type or a compact-type double-skin "window and door".

BACKGROUND ART

The double-skin windows and doors structure are widely used as a technology for saving cooling and heating energy in buildings.

The biggest feature of double-skin windows and doors, which have a structure in which two windows face indoors and outdoors respectively, is to reduce the solar heat gain coefficient (SHGC) into 0.1 to 0.2 or less by throwing out to the outside the overheat in the air cavity layer caused by solar radiation inflowing during the cooling period.

Generally, a glass with very high transmittance is selected for a glass of windows and doors applied to the exterior surface, and in the cooling period, the overheating in the air cavity layer is thrown away to block solar radiation, and in the winter season, warm preheat that is generated from the air cavity layer in the same way is introduced into the room, then the ventilation effect can be maximized.

The most common double-skin windows and doors are a corridor-type double-skin (800 mm of a hollow layer width) that can control the inflow of solar heat by installing a blind in the hollow layer, but there are limitations in that the structure is too large, complicated, and expensive.

In addition, the outer window is normally configured to be an electrically opened and closed structure, so that it is configured to be an automatically closed structure to protect a pent roof of the hollow layer when the external wind pressure is high.

Accordingly, by reducing the width of the hollow layer to within 200 to 300 mm to lighten the structure, the market for compact double-skin windows and doors with awnings or pent roofs in the hollow layer, which can be reasonably configured in terms of cost, could be grown.

However, there is a limitation that damage and the need for maintenance increase when the awning applied to the hollow layer exists in the higher floor part of a high-rise building or in the high wind pressure.

Therefore, in order to secure the structural safety of the hollow layer awning, the thickness of the awning becomes thick, and a separate rail structure for fixing it should be added. Also, it is prepared so that the awning can be electrically turned off when high wind pressure occurs.

RELATED ART DOCUMENT

Patent Document

Korean patent application publication No. 10-2020-0011024, published on Feb. 7, 2002.

DISCLOSURE

Object of Invention

The present invention has been devised to solve the above problems, and an object of the present invention is to provide a slim double-skin structure to enabling to reduce a width of an air cavity layer (or a hollow layer) of a corridor-type double-skin or a compact-type double-skin "window and door".

And the present invention is to provide a slim double-skin structure that can be provided with a glass fixing frame and awning integrally.

In addition, the awning is integrated with the glass fixing frame so that the thickness of the windows and doors can be reduced, and above all, it becomes possible to obtain the rail that can fix the awning at right and left and top and bottom, thereby the shaking and damage of the awning can be alleviated when the external window is opened.

In particular, through such a structure, the structure can be configured to be capable of preparing for wind pressure without a separate electric device.

Technical Solution

In order to achieve the above objects, a slim double-skin structure according to an embodiment of the present invention may comprise: a window frame, an outer window sash frame provided on an outdoor side and coupled to the window frame, an outer glass provided on the outer window sash frame, an inner window sash frame provided on an indoor side and coupled to the window frame, an inner glass provided on the inner window sash frame, an awning film provided in a hollow layer formed between the outer glass and the inner glass to serve as a shading, and a case-type glass fixing frame which is provided in the outer window sash frame so as to be located in the hollow layer and fixes the outer glass to the outer window sash frame concurrently with building-in and guiding the awning film.

The outer window sash frame may be provided with an insertion groove, which is formed on the hollow layer side and, into which the case-type glass fixing frame is inserted.

The case-type glass fixing frame comprises an upper end portion provided at an upper end of the outer window sash frame, a pair of side portions that are provided at both longitudinal ends of the upper end portion, respectively, and are provided on the side surface of the outer window sash frame, and a lower end portion which combines with the pair of side portions and is provided at a lower end of the outer window sash frame.

The upper end portion may comprise a storage box in which an inner space is prepared and the awning film is built in, a roll provided in the inner space to wind the awning film, an opening which is provided on a lower surface of the storage box and where the awning film is drawn out of the storage box, and a first insertion protrusion which is provided on an upper surface of the storage box and which is fitted into an insertion groove formed on the upper end of the outer window sash frame.

The side portion may comprise a side connecting rod that is provided to be elongated in an up and down direction and is connected to the storage box, a rail which is provided inside the side connecting rod and which an insertion part is formed to guide a guide projection provided on both left and right ends of the awning film, a second insertion protrusion which is provided on one surface of the window frame side of the side connecting rod and is fitted into the insertion groove formed on a side surface of the outer window sash frame.

The lower end portion may comprise a lower end connecting rod that is provided to be elongated in a left and right direction and is connected to the side connecting rod, and a third insertion protrusion which is provided on one surface of the window frame side of the lower end connecting rod and is fitted into the insertion groove formed on a lower end of the outer window sash frame.

The first to third inserting protrusions may comprise a first portion inserted into the insertion groove, and a second portion which is extending from the first portion, when fixing the case-type glass fixing frame to the outer window sash frame, which allows the case-type glass fixing frame to be fixed to the outer window sash frame by being caught on a stopping projection provided to the outer window sash frame.

Advantageous Effects

According to the slim double-skin structure of the present invention, it is possible to reduce the width of the hollow layer of the corridor-type double-skin or compact-type double-skin window and door.

And the glass fixing frame and the awning may be provided integrally.

In addition, by additionally fixing the awning to the insertion groove of the glass fixing frame on the side, it is possible to more stably respond to the behavior and damage caused by wind pressure.

DETAILED DESCRIPTION OF THE INVENTION

Hereinafter, a slim double-skin structure according to one example of the present invention will be described with reference to the accompanying drawings in detail.

Figure 1:
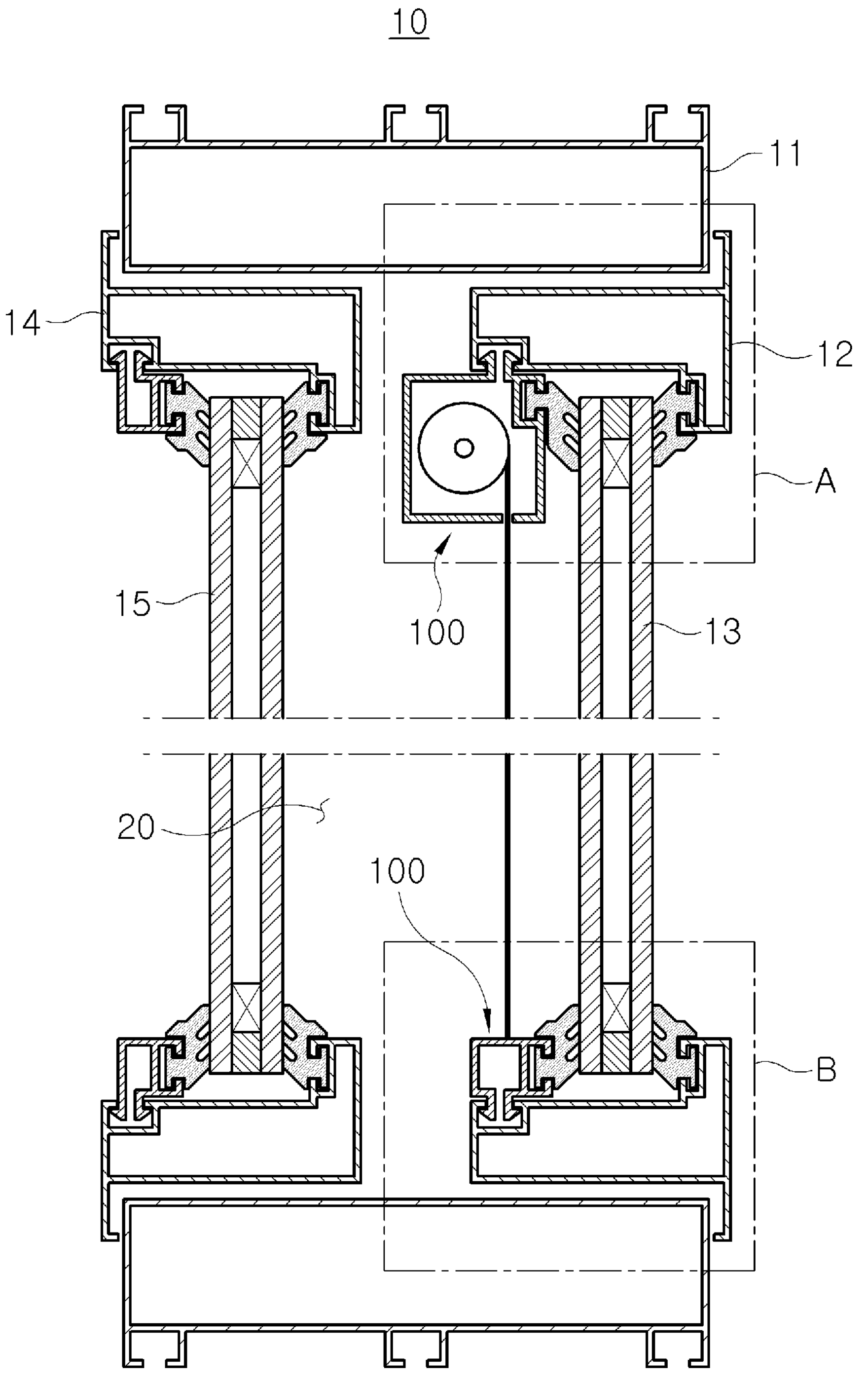
FIG. 1 is a longitudinal sectional view of the slim double-skin structure of one example of the present invention.

FIG. 1 is a longitudinal sectional view of the slim double-skin structure of one example of the present invention.

As shown in FIG. 1, a slim double-skin structure 10 according to an embodiment of the present invention may comprise a window frame 11, an outer window sash frame 12 provided on an outdoor side and coupled to the window frame 11, an outer glass 13 provided on the outer window sash frame 12, an inner window sash frame 14 provided on an indoor side and coupled to the window frame 11, an inner glass 15 provided on the inner window sash frame, an awning film 16 provided in a hollow layer formed between the outer glass 13 and the inner glass 15 to serve as a shading, and a case-type glass fixing frame 100 which is provided in the outer window sash frame 12 so as to be located in the hollow layer and fixes the outer glass 13 to the outer window sash frame 12 concurrently with building-in and guiding the awning film 16.

The outer window sash frame 12 and the outer glass 13 form a double-skin structure together with the inner window sash frame 14 and the inner glass 15, while forming the hollow layer therebetween, and the case-type glass fixing frame 100 is located in the hollow layer so that it serves to fix the outer glass 13 to the outer window sash frame 12, while building-in and guiding the awning film 16.

By fixing the outer glass 13 to the outer window sash frame 12 through the case-type glass fixing frame 100 and embedding in and guiding the awning film 16, the width of the hollow layer can be reduced, and the structural safety of the awning film 16 can be secured, and it is possible to save the installation space of the awning film.

In addition, it is possible to reduce costs through functional integration, and to apply to a single pane window, other than a double pane window, so that structural safety can be secured and high sun protection effect can be exhibited.

Next, the case-type glass fixing frame 100 of the slim double skin structure 10 according to an embodiment of the present invention is explained. In the following description, only parts different from the above-described embodiments will be described in detail, and detailed descriptions of the same or extremely similar parts will be omitted.

Figure 2:
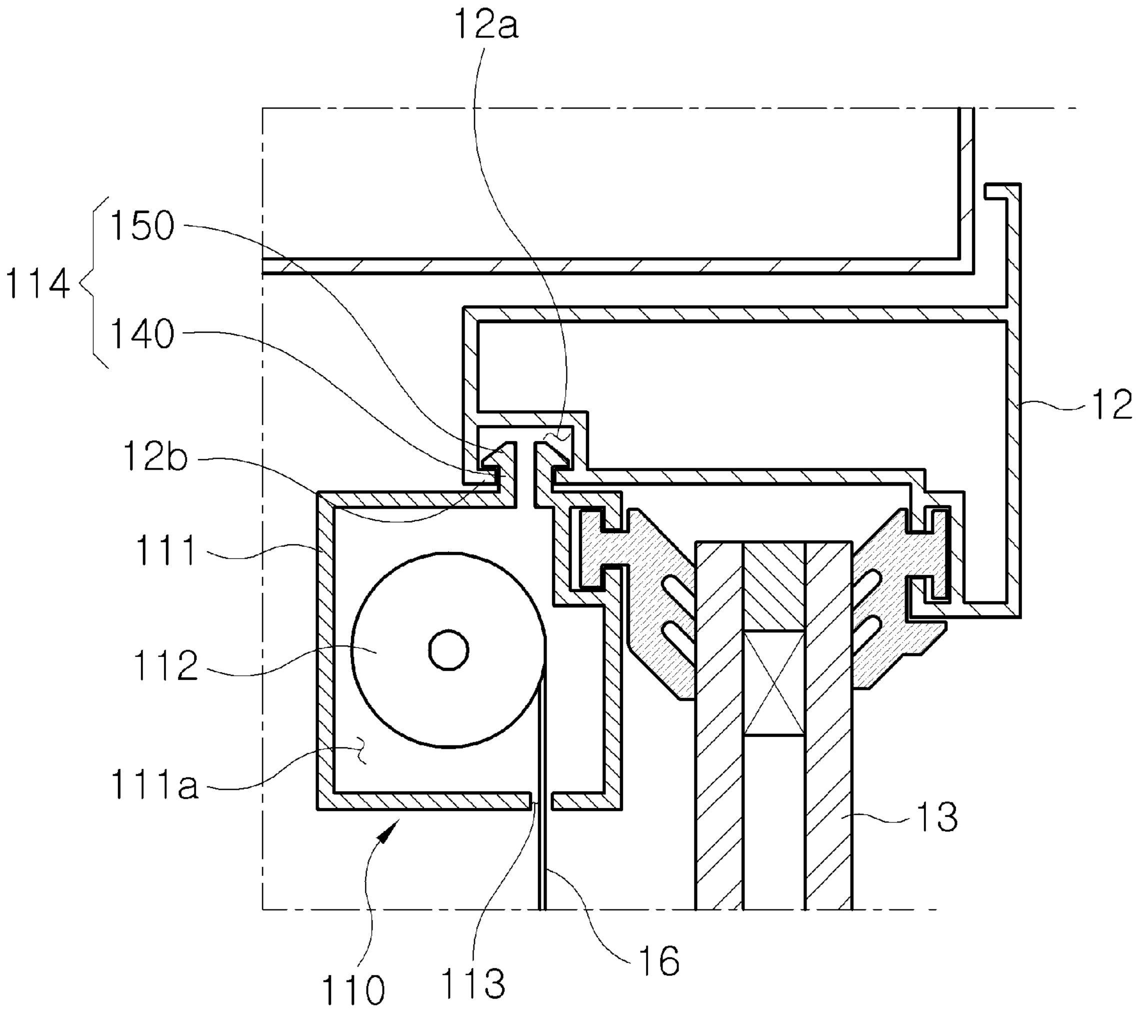
FIG. 2 shows a portion A of FIG. 1.
Figure 3:
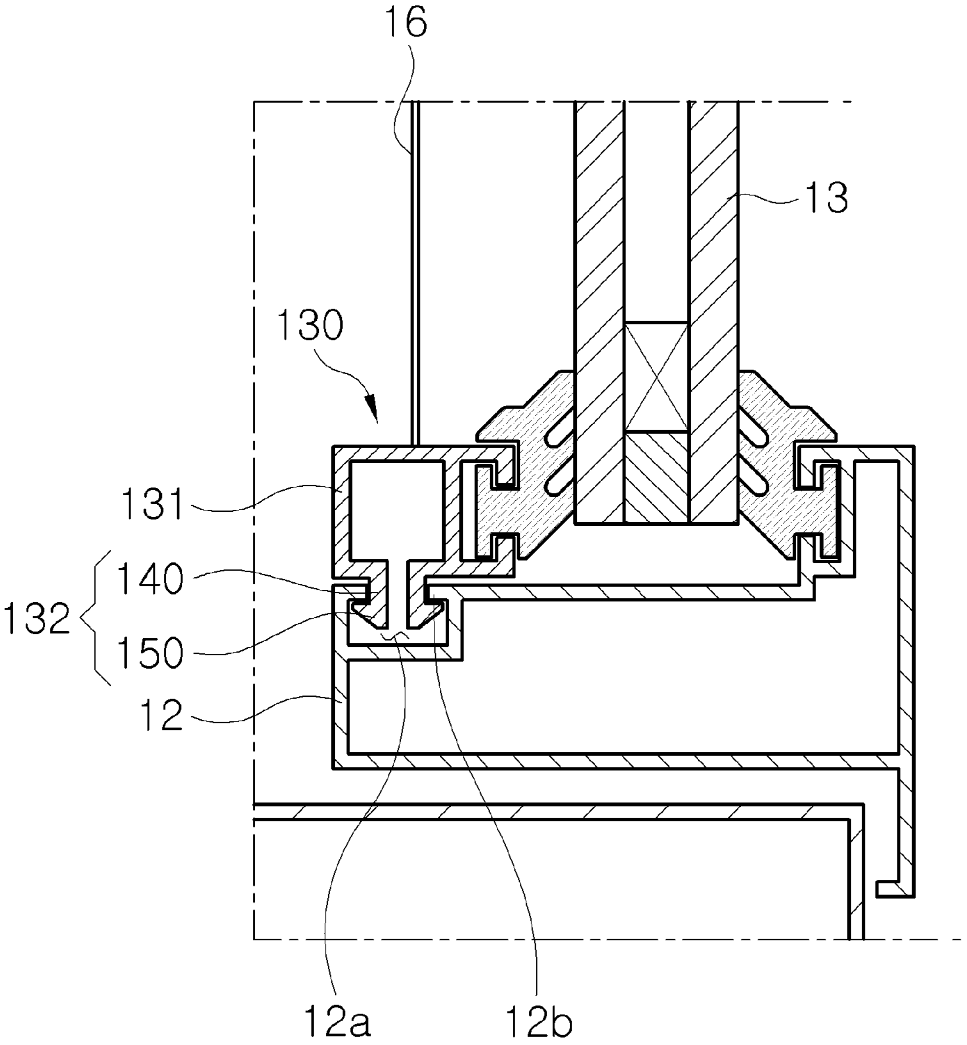
FIG. 3 shows a portion B of FIG. 1.
Figure 4:
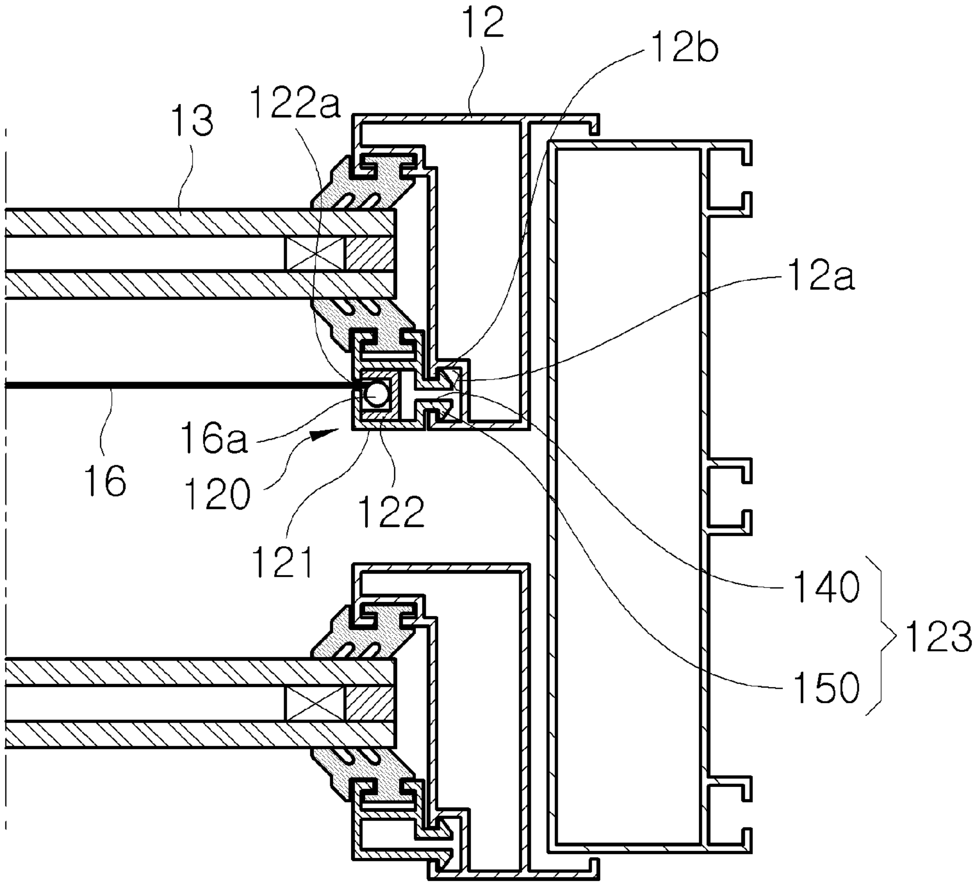
FIG. 4 is a cross-sectional view of the slim double-skin structure of FIG. 1.
Figure 5:
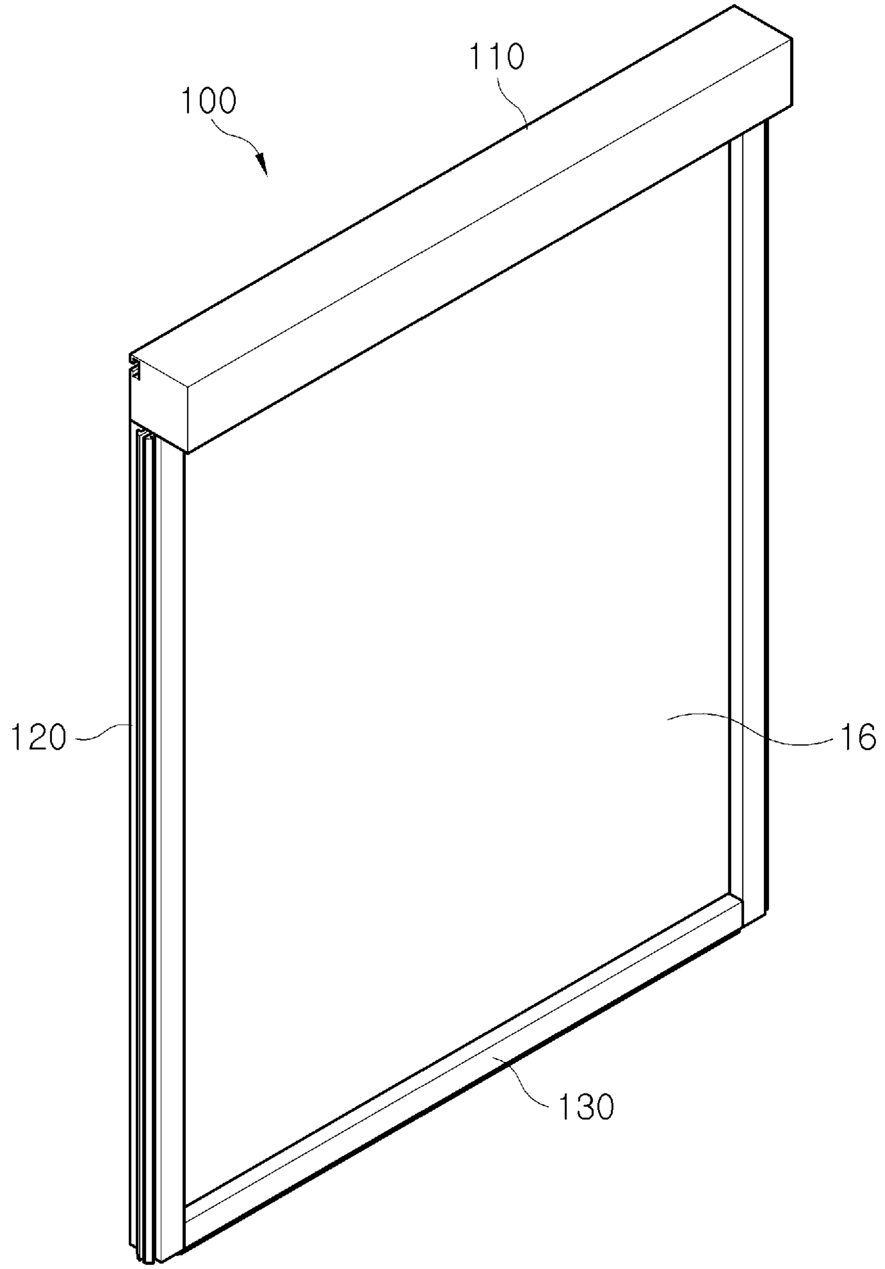
FIG. 5 is a perspective view of a case-type glass fixing frame of the slim double-skin structure of FIG. 1.

FIG. 2 shows a portion A of FIG. 1., FIG. 3 shows a portion B of FIG. 1, FIG. 4 is a cross-sectional view of the slim double-skin structure of FIG. 1, and FIG. 5 is a perspective view of a case-type glass fixing frame of the slim double-skin structure of FIG. 1.

Referring to FIG. 1 to FIG. 5, a slim double-skin structure 10 according to an embodiment of the present invention may comprise a window frame 11, an outer window sash frame 12 provided on an outdoor side and coupled to the window frame 11, an outer glass 13 provided on the outer window sash frame 12, an inner window sash frame 14 provided on an indoor side and coupled to the window frame 11, an inner glass 15 provided on the inner window sash frame, an awning film 16 provided in a hollow layer formed between the outer glass 13 and the inner glass 15 to serve as a shading, and a case-type glass fixing frame 100 which is provided in the outer window sash frame 12 so as to be located in the hollow layer and fixes the outer glass 13 to the outer window sash frame 12 concurrently with building-in and guiding the awning film 16.

And the outer window sash frame 12 may be provided with an insertion groove 12*a*, which is formed on the hollow layer side and, into which the case-type glass fixing frame 100 is inserted.

For more details in the case-type glass fixing frame 100, the case-type glass fixing frame 100 comprises an upper end portion 110 provided at an upper end of the outer window sash frame 12, a pair of side portions 120 which are provided at both longitudinal ends of the upper end portion 110, respectively, and are provided on the side surface of the outer window sash frame 12, and a lower end portion 130 which combines with the pair of side portions 120 and is provided at a lower end of the outer window sash frame 12.

The case-type glass fixing frame 100 consisting of an upper end portion 110, a pair of side portions 120 and a lower end portion 130 has a rectangular frame shape, is located in the hollow layer, and is fixed to the outer window sash frame 12.

First, for more details in the upper end portion 100, the upper end portion 100 may comprise a storage box 111 in which an inner space 111*a* is prepared and the awning film 16 is built in, a roll 112 provided in the inner space 111*a* to wind the awning film 16, and an opening 113 which is provided on a lower surface of the storage box 111 and where the awning film 16 is drawn out of the storage box 111, and a first insertion protrusion 114 which is provided on an upper surface of the storage box 111 and which is fitted into an insertion groove 12*a* formed on the upper end of the outer window sash frame 12.

The storage box 111 is provided to be elongated in the left and right direction at the upper end of the outer window sash frame 12, and the roll 112 on which the awning 16 film is wound is associated with a separate control device (not shown), and winds the awning film 16 so as to transmit light or releases the awning film 16 so as to block light transmission depending on the situation, and the opening 113 is preferably provided so as to be adjacent to the side of the outer window sash frame 12 to enhance the shading effect of the awning film 16 when blocking light transmission.

The first inserting protrusion 114 may comprise a first portion 140 inserted into the insertion groove 12*a*, and a second portion 150 which is extending from the first portion 140, when fixing the case-type glass fixing frame 100 to the outer window sash frame 12, which allows the case-type glass fixing frame 100 to be fixed to the outer window sash frame 12 by being caught on a stopping projection 12*b* provided to the outer window sash frame 12.

On the other hand, the side portion 120 may comprise a side connecting rod 121 that is provided to be elongated in an up and down direction and is connected to the storage box 111, a rail 122 which is provided inside the side connecting rod 121 and insertion part 122*a* is formed to guide a guide projection 16*a* provided on both left and right ends of the awning film 16, a second insertion protrusion 123 which is provided on one surface of the window frame 11 of the side connecting rod 121 and is fitted into the insertion groove 12*a* formed on a side surface of the outer window sash frame 12.

When the awning film 16 is wound or unwound by the roll 112, it can safely move up and down by the rail 122 guiding the guide protrusion 16*a*, and as the left and right ends are constrained by the rail 122 inserted into the insertion part 122*a*, even if the outer glass 13 is opened, it is possible to prevent the fine movement or damage of the awning film 16, thereby minimizing the need for maintenance and maximizing the effect of natural ventilation.

The second inserting protrusion 123 may comprise a first portion 140 inserted into the insertion groove 12*a*, and a second portion 150 which is extending from the first portion 140, when fixing the case-type glass fixing frame 100 to the outer window sash frame 12, which allows the case-type glass fixing frame 100 to be fixed to the outer window sash frame 12 by being caught on a stopping projection 12*b* provided to the outer window sash frame 12.

On the other hand, the lower end portion 130 may comprise a lower end connecting rod 131 that is provided to be elongated in a left and right direction and is connected to the side connecting rod 121, and a third insertion protrusion 132 which is provided on one surface of the window frame 11 of the lower end connecting rod 131 and is fitted into the insertion groove 12*a* formed on a lower end of the outer window sash frame 12.

The lower end connecting rod 131 is provided in a structure in which the awning film 16 can be built-in for a certain length like the storage box 111 or is provided in the form of a bar as shown in the drawing, so that the rectangular frame shape of the case-type glass fixing frame 100 can be achieved.

The third inserting protrusion 132 may comprise a first portion 140 inserted into the insertion groove 12*a*, and a second portion 150 which is extending from the first portion 140, when fixing the case-type glass fixing frame 100 to the outer window sash frame 12, which allows the case-type glass fixing frame 100 to be fixed to the outer window sash frame 12 by being caught on a stopping projection 12*b* provided to the outer window sash frame 12.

As described above, the case-type glass fixing frame 100 allows the hollow layer to be formed slim to within 50 mm and at the same time can be easily applied to the existing wall thickness, and the fixing of the outer glass 13 and the building-in and guiding of the awning film 16 are structurally integrated so that the increase in construction cost can be minimized, and realizing simplification and rationalization in terms of design can become effected.

In particular, when an awning is installed on an existing double-skin windows and doors, a separate guide rail structure is required on the side to minimize the behavior of the awning due to drafts when the outer window is opened, but a slim double-skin structure 10 according to an embodiment of the present invention is integrated using the glass fixing frame 100, so that a separate rail is not required.

In the above, a slim double-skin structure according to an embodiment of the present invention was described, but technical spirit of the invention cannot be limited by examples disclosed herein. And those skilled in the art that understand technical spirit of the invention can easily suggest other examples by adding, changing, deleting, appending, etc. components within same scope of technical spirit, and they will also belong to the scope of technical spirit of the invention.

| * Reference numeral* | |
|---|---|
| 10: Slim double skin structure | 11: Window frame |
| 12: Outer window sash frame | 12a: Insertion groove |
| 12b: Stopping projection 12b | 13: Outer glass |
| 14: Inner window sash frame | 15: Inner glass |
| 16: Awning film | 16a: Guide projection |
| 100: Case-type glass fixing frame | 110: Upper end portion |
| 111: Storage box | 111a: Inner space |
| 112: Roll | 113: opening |
| 114: First insertion projection | 120: Side portion |
| 121: Side connecting rod | 122: Rail |
| 122a: Insertion part | 123: Second insertion protrusion |
| 130: lower end portion | 131: Lower end connecting rod |
| 132: Third insertion protrusion | 140: first portion |
| 150: second portion | |

What is claimed is:

1. A double-skin structure comprising a window frame, an outer window sash frame provided on an outdoor side and coupled to the window frame, wherein said outer window sash frame is provided with an insertion groove, which is formed on the hollow layer, an outer glass provided on the outer window sash frame, an inner window sash frame provided on an indoor side and coupled to the window frame, an inner glass provided on the inner window sash frame, an awning film provided in a hollow layer formed between the outer glass and the inner glass to serve as a shading, a case-type glass fixing frame which is provided in the outer window sash frame so as to be located in the hollow layer and fix the outer glass to the outer window sash frame concurrently with building-in and guiding the awning film, the case-type glass fixing frame being inserted into the insertion groove.

2. The double-skin structure according to claim 1, wherein the case-type glass fixing frame comprises:

an upper end portion provided at an upper end of the outer window sash frame, a pair of side portions that are provided at both longitudinal ends of the upper end portion, respectively, and are provided on a side surface of the outer window sash frame, and a lower end portion which combines with the pair of side portions and is provided at a lower end of the outer window sash frame.

3. The double-skin structure according to claim 2, wherein the upper end portion comprises:

a storage box in which an inner space is prepared and the awning film is built in, a roll provided in the inner space to wind the awning film, an opening which is provided on a lower surface of the storage box and where the awning film is drawn out of the storage box, and a first insertion protrusion which is provided on an upper surface of the storage box, and which is fitted into the insertion groove formed on the upper end of the outer window sash frame.

4. The double-skin structure according to claim 3, wherein the side portion comprises:

a side connecting rod that is elongated in an up and down direction and is connected to the storage box, a rail which is provided inside the side connecting rod and in which an insertion part is formed to guide a guide projection provided on both left and right ends of the awning film, and a second insertion protrusion which is provided on one surface of the window frame of the side connecting rod and is fitted into the insertion groove formed on the side surface of the outer window sash frame.

5. The double-skin structure according to claim 4, wherein the lower end portion comprises:

a lower end connecting rod that is elongated in a left and right direction and is connected to the side connecting rod, and a third insertion protrusion which is provided on one surface of the window frame of the lower end connecting rod and is fitted into the insertion groove formed on a lower end of the outer window sash frame.

6. The double-skin structure according to claim 5, wherein the first to third inserting protrusions comprises:

a first portion inserted into the insertion groove, and a second portion which extends from the first portion, when fixing the case-type glass fixing frame to the outer window sash frame, which allows the case-type glass fixing frame to be fixed to the outer window sash frame by being caught on a stopping projection provided to the outer window sash frame.

* * * * *